(12) United States Patent
Bellotti et al.

(10) Patent No.: US 10,753,749 B2
(45) Date of Patent: Aug. 25, 2020

(54) SYSTEM AND METHOD FOR INTEGRATING RECOMMENDED EXERCISE WITH TRANSPORTATION DIRECTIONS

(71) Applicant: Conduent Business Services, LLC, Dallas, TX (US)

(72) Inventors: Victoria M. E. Bellotti, San Francisco, CA (US); Christian Fritz, Menlo Park, CA (US)

(73) Assignee: Conduent Business Services, LLC, Richardson, TX (US)

(*) Notice: Subject to any disclaimer, the term of this patent is extended or adjusted under 35 U.S.C. 154(b) by 0 days.

(21) Appl. No.: 15/431,359

(22) Filed: Feb. 13, 2017

(65) Prior Publication Data
US 2018/0231386 A1    Aug. 16, 2018

(51) Int. Cl.
| | | |
|---|---|---|
| G01C 21/20 | (2006.01) | |
| A63B 24/00 | (2006.01) | |
| G01C 22/00 | (2006.01) | |
| G09B 19/00 | (2006.01) | |
| G01C 21/34 | (2006.01) | |

(52) U.S. Cl.
CPC .......... *G01C 21/20* (2013.01); *G01C 21/3423* (2013.01); *G01C 21/3484* (2013.01); *G01C 22/006* (2013.01); *G09B 19/003* (2013.01); *G09B 19/0038* (2013.01)

(58) Field of Classification Search
CPC ...... G01C 9/00; G01C 21/3484; G01C 21/36; G01C 22/002; G01C 22/006; G01C 22/02; G01C 21/34; G01C 21/20; A63B 24/0075; A63B 2220/17; A63B 2220/20; A63B 2220/62; A63B 2220/73; A63B 2220/836; A63B 2230/06; A63B 2230/75; G09B 19/003; G09B 19/0092
See application file for complete search history.

(56) References Cited

U.S. PATENT DOCUMENTS

| | | | | |
|---|---|---|---|---|
| 9,464,906 | B1 * | 10/2016 | Baughman | G01C 21/3469 |
| 9,970,777 | B2 * | 5/2018 | Lee | G01C 21/343 |
| 2011/0003665 | A1 * | 1/2011 | Burton | G04F 10/00 482/9 |
| 2011/0160996 | A1 * | 6/2011 | Terai | G01C 21/3423 701/532 |
| 2012/0101723 | A1 * | 4/2012 | Kendall | G01C 21/20 701/433 |
| 2016/0058336 | A1 * | 3/2016 | Blahnik | A61B 5/1112 |

* cited by examiner

*Primary Examiner* — Hunter B Lonsberry
*Assistant Examiner* — Mathew Franklin Gordon

(57) ABSTRACT

One embodiment provides a system for facilitating integration of recommended exercise with transportation directions. During operation, the system generates, by a mobile computing device associated with a user, a request for a route from a start location to a destination location. The system determines one or more of the user's transportation-related preferences, which include the user's activity level goal. The system monitors the user's activity requirement. The system receives the route, which includes one or more segments, wherein a segment indicates a transportation type and a corresponding activity value, wherein the route is calculated based on the transportation-related preferences and the monitored activity requirement, thereby facilitating integration of recommended exercise with transportation directions.

20 Claims, 8 Drawing Sheets

SYSTEM AND METHOD FOR INTEGRATING RECOMMENDED EXERCISE WITH TRANSPORTATION DIRECTIONS

BACKGROUND

Field

This disclosure is generally related to transportation. More specifically, this disclosure is related to a system and method for integrating recommended exercise with transportation directions.

Related Art

The use of personal activity trackers continues to grow at a rapid pace. Smart watches or other personal wireless-enabled wearable devices (such as FitBit and Garmin) track a user's daily activity in a variety of fitness-related areas, including steps taken, calories consumed, elevation climbed, pedal cycles completed, and heart rate achieved. These devices may include applications which allow the user to input personal information and daily (or some other time-interval) target activity level information. The personal information (e.g., height and weight) can allow the system to calculate an average walking pace or stride, while the target activity level information may be used to indicate to the user a remaining number of steps to be taken over a specific time period (e.g., a 24-hour period). Some applications may also allow the user to perform a series of physical tests to better gauge or estimate, e.g., the user's average walking speed. Some applications may also display the user's route while performing an activity, such as going for a walk or a run. However, while these fitness-related applications may be used during a user's commute or other transportation route, they do not provide transportation directions.

At the same time, current map applications provide transportation directions, and further allow a user to select a route based on a single mode of transportation, e.g., car, walking, biking, or public transit. However, these map applications do not provide activity level information specific to the user. Hence, neither the current fitness-related applications nor the current map applications integrate the user's specific activity level goals and performance with the user's requested transportation directions over multiple modes of transportation.

SUMMARY

One embodiment provides a system for facilitating integration of recommended exercise with transportation directions. During operation, the system generates, by a mobile computing device associated with a user, a request for a route from a start location to a destination location. The system determines one or more of the user's transportation-related preferences, which include the user's activity level goal (which may be expressed in various ways with various sub-goals, such as a daily target activity level expressed as calories burned that would be equivalent to the user's recommended exercise for that day) and monitored performance in relation to the activity level goal (which implies a remaining activity requirement to meet the activity level goal). The system monitors the user's remaining activity requirement to achieve the activity level goal, e.g., throughout a pre-determined time period, as the remaining activity requirement gradually decreases as the target activity level goal for that time period is closer to being achieved. The system receives the route, which includes one or more segments, wherein a segment indicates a transportation type and a corresponding activity value (which is associated with that transportation type at the time of and for the duration of travel, e.g., calories typically consumed by a 140 pound woman standing on a subway train for twenty minutes during rush hour), wherein the route is calculated based on the transportation-related preferences and the monitored activity requirement, thereby facilitating integration of recommended exercise with transportation directions.

In some embodiments, the corresponding activity value includes one or more of: a number of calories predicted to be consumed for completing the segment; a number of steps predicted to be taken for completing the segment; and an amount of elevation predicted to be gained for completing the segment.

In some embodiments, the transportation type includes one or more of: a motorized vehicle associated with the user, including one or more of a car, a scooter, a wheelchair, and any motorized vehicle with one or more wheels; a non-motorized vehicle associated with the user, including one or more of a bicycle, a wheelchair, a scooter, a vehicle which moves based on a motion with the user's feet or hands, a waterborne non-motorized personal vehicle, an airborne non-motorized personal vehicle, and any non-motorized vehicle with one or more wheels; non-motorized equipment that attaches to the user's body, including one or more of in-line skates, roller skates, and any gear which allows the user to move based on a motion with the user's body; walking, jogging, skipping, jumping, and running; and a public transit vehicle, including one or more of a train, a bus, a boat, a ship, a ferry, a helicopter, an airplane, a waterborne public transit vehicle, an airborne public transit vehicle, and any public transit vehicle with one or more wheels.

In some embodiments, the system determines a profile for the user based on the user's transportation-related preferences, which include: a desired transportation type; and the user's sub-goals related to activity level and other areas, including at least one of: a target number of calories to be consumed for a predetermined time period; a target number of steps to be taken for a predetermined time period; a target amount of elevation to be gained for a predetermined time period; a desired duration of time to complete the route; a desired price to be paid to complete the route; and a desired level of sustainability to be achieved to complete the route.

In some embodiments, the route is calculated further based on one or more of: the start location; the destination location; map data, including historical or real-time data associated with a geographical area which includes the start location and the destination location; and data obtained via a sensor of the user's mobile computing device.

In some embodiments, monitoring the user's remaining activity requirement to achieve the activity level goal is based on one or more of: a wireless-enabled wearable device that tracks the user's physical activity, e.g. throughout a pre-determined time period, providing a dynamically updated remaining activity requirement which is based on cumulative past activity during that time period; a heart-rate monitoring device; an estimated number of calories consumed in completing the segment, e.g., based on other users of similar demographic make-up, such as gender, age, and weight; a number of actual steps taken in completing the segment, e.g., by other users of similar demographic make-up; an amount of actual elevation gained in completing the segment, e.g., by other users of similar demographic make-up; a measure of a price paid for completing the segment; and a measure of sustainability achieved in completing the segment.

In some embodiments, the transportation-related preferences further include: the user's desired time, which is a desired duration of time to be spent in a predetermined time period or to complete the route; the user's desired price, which is a desired price to be paid in a predetermined time period or to complete the route; and the user's desired sustainability, which is a desired level of sustainability to be achieved in a predetermined time period or to complete the route. The route further indicates one or more of: the user's activity level goal compared to the user's monitored activity requirement; the user's desired time compared to the user's monitored actual time spent; the user's desired price compared to the user's monitored actual price paid; and the user's desired sustainability compared to the user's monitored actual sustainability achieved.

BRIEF DESCRIPTION OF THE FIGURES

In the figures, like reference numerals refer to the same figure elements.

DETAILED DESCRIPTION

Figure 1:
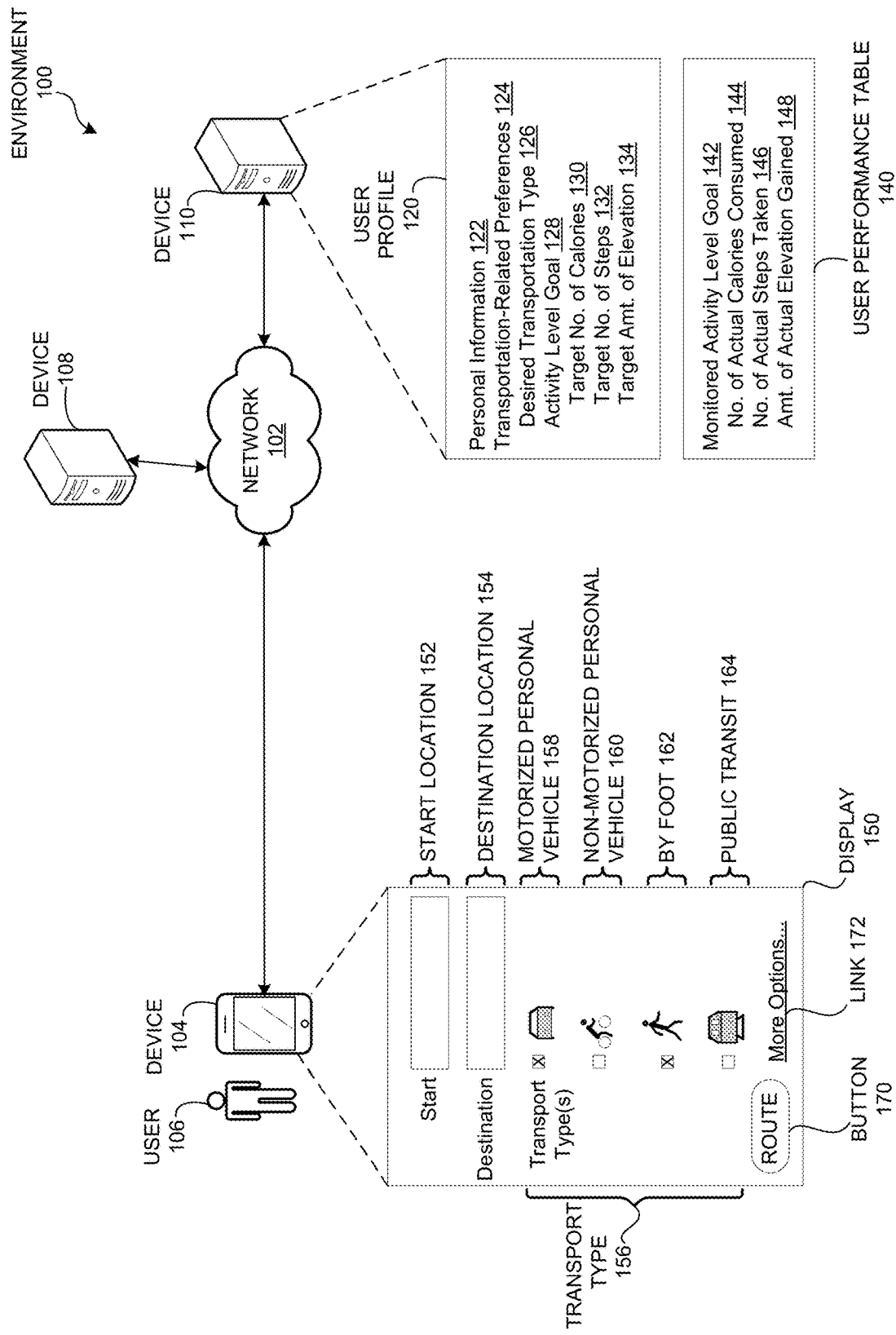
FIG. 1 illustrates an exemplary environment which facilitates integration of recommended exercise with transportation directions, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates integration of recommended exercise with transportation directions for a user, based on several factors. As described above, personal activity-tracking applications can monitor a user's cumulative activity level performance compared to the user's activity level goal. However, while these applications may be used during the user's commute or other transportation route, they do not provide transportation directions.

At the same time, current map applications provide transportation directions, and further allow a user to select a route based on a single mode of transportation, e.g., car, walking, biking, or public transit. However, these map applications do not provide user-specific activity level information. Hence, neither the current fitness-related applications nor the current map applications integrate the user's specific activity level goal and performance with the user's requested transportation directions over multiple modes of transportation.

Embodiments of the present invention provide a system which facilitates integration of recommended exercise with transportation directions. The system can calculate a requested route in a map-like application for a user based on the user's transportation-related preferences, which can include a desired transportation type (e.g., car, walking, biking) and an activity level goal (e.g., a target number of calories to be burned on a daily basis). The system can further calculate the route based on map data (real-time or historical), traffic patterns, and data obtained via a sensor of the user's mobile device (e.g., a smart watch or a smart phone). The system can provide the calculated route to the user via the user's mobile device. The route can include one or more segments, which can each be displayed and include a transportation mode, a segment time/distance, and a corresponding activity value (e.g., walking, 1.0 mile/17 minutes, and 120 calories to be consumed). The user can thus optimize his amount of daily exercise by completing the recommended route, e.g., walking a segment of the recommended route as part of a daily commute.

The system can monitor the user's activity and that of all its other users, both as part of completing a recommended route and throughout the day (e.g., number of steps taken and as tracked via a personal activity-tracking device of the user). This enables the system to make estimates of activity level required to complete any given segment in the transportation system based on, for example, some expert input and logs of similar users (e.g., how many steps and floors climbed/descended are demanded of a 5'4" 45-year old woman getting to and from the subway train and how long she is likely to be standing, depending on the time of day and, based on her age and weight, how many calories she is likely to burn during these activities). The system can then integrate user-specific transportation directions and corresponding predicted activity demands with the user's activity level goal and the monitored activity requirement. The system can also recommend directions based on other factors, such as price, duration, and sustainability.

Thus, embodiments of the present invention provide a system which improves both activity level recommendations and transportation directions, where the improvements are fundamentally technological. The system provides a technological solution (e.g., an application which provides one or more routes, where a route includes multiple segments each corresponding to a different transportation mode and an activity value, where the application relies on map and sensor data, monitored performance of the user's physical activity, and the user's personal activity level goal) to the technological problem of the efficient and effective optimization of exercise and transport in a single application.

Exemplary Network and Communication

FIG. 1 illustrates an exemplary environment 100 which facilitates integration of recommended exercise with transportation directions, in accordance with an embodiment of the present invention. Environment 100 can include a computer network 102. Environment 100 can also include a user 106 associated with a computing device 104. Device 104 can be a personal mobile computing device, such as a smart phone, a wireless-enabled wearable device, a smart watch, a device with a GPS or other tracking mechanism, or any device which can interact with other devices over network 102. Device 104 can include a display 150, which can include an initial start or route request screen. Display 150 can include widgets, via which user 106 can enter request-specific information, including: a start location 152; a destination location 154; and a transportation type 156 which includes check boxes and corresponding images for a motorized personal vehicle 158, a non-motorized personal vehicle 160, a "by foot" 162, and a public transit 164. Display 150 can also include a button 170 to transmit the request (e.g., clicking button 170 can result in the exemplary displays depicted in FIG. 2A) and a link 172 (e.g., clicking link 172 can result in the exemplary display depicted in FIG. 2B). In display 150, two transportation types are selected (motorized personal vehicle 158 and by foot 162). The user can select any combination of transportation types, and the system can calculate a route with segments based on the selected transportation types as well as map data (retrieved, e.g., via device 104) and the user's transportation-related preferences (determined, e.g., via a user profile 120).

Environment 100 can also include devices 108 and 110. Device 108 can include map data or be connected to a central service with map data, and device 110 can include information specific to user 106, including user profile 120 and a user performance table 140. User profile 120 can include personal information 122 and transportation-related preferences 124, which can include a desired transportation type 126 and an activity level goal 128.

Transportation-related preferences 124 can include other types of goals, sub-goals, and goal-specific factors, as described below in relation to FIG. 3A. As an example, activity level goal 128 can include the following sub-goal-specific factors: a target number of calories to be burned 130, a target number of steps to be taken 132, and a target amount of elevation to be gained 134. Factors 130-134 can relate to a predetermined or user-configured period of time, such as a 12-hour period, a 24-hour period, or a single trip.

Device 110 can also include a user performance table 140, which can include information relating to the user's monitored activity level, e.g., which may be dynamically updated based on monitoring the user's cumulative activity level. Table 140 can include a monitored activity level 142, which can include the following monitored factors: a number of actual calories consumed 144; a number of actual steps taken 146; and an amount of actual elevation gained 148. As with sub-goal-specific factors 130-134, monitored factors 144-148 can relate to a predetermined or user-configured period of time.

Thus, the system provides transportation directions for a user, where the directions integrate recommended exercise for a user (based on many factors, including the start and the destination location, dynamic map data, dynamically changing transportation-related preferences of the user, sensor data, and the user's monitored cumulative activity level in relation to the activity level goal).

Exemplary Displays on User Device

Figure 2A:
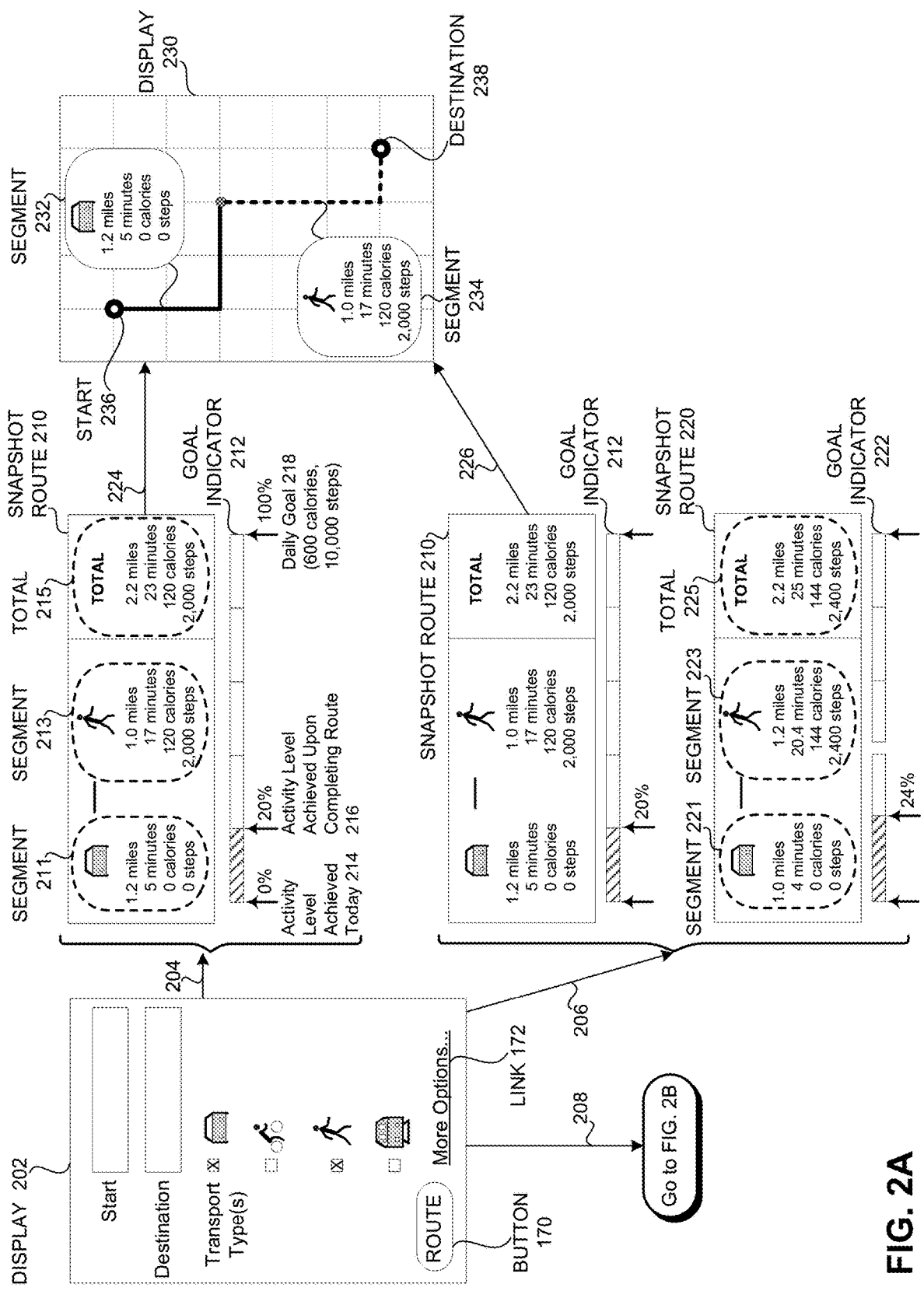
FIG. 2A presents exemplary displays for facilitating integration of recommended exercise with transportation directions, in accordance with an embodiment of the present invention.

FIG. 2A presents exemplary displays 202 and 230 for facilitating integration of recommended exercise with transportation directions, in accordance with an embodiment of the present invention. Display 202 can correspond to display 150 of FIG. 1, with two selected transportation types: motorized personal vehicle and by foot. A user can enter a start location and a destination location, and click on "Route" button 170, which can result in either a flow 204 or a flow 206. In flow 204, the system can display a single snapshot route 210, including segments which each indicate a (selected) transportation type and a corresponding activity value. For example, snapshot route 210 can include a segment 211, via a motorized personal vehicle, with a distance of 1.2 miles, an estimated time duration of 5 minutes to complete segment 211, and an activity value for segment 211 (which includes 0 calories to be burned and 0 steps to be taken in completing segment 211). Snapshot route 210 can also include a segment 213, via walking, with a distance of 1.0 miles, an estimated time duration of 17 minutes to complete segment 213, and an activity value for segment 213 (which includes 120 calories to be consumed and 2,000 steps to be taken in completing segment 213). Snapshot route 210 can also include a "Total" 215 area, including: a total distance of 2.2 miles from the start location to the destination location; a total time of 23 minutes to complete snapshot route 210 including segments 211 and 213; and a total activity value for completing snapshot route 210 (which includes a total of 120 calories to be consumed and 2,000 steps to be taken in completing snapshot route 210).

Snapshot route 210 can also include a goal indicator 212, which can include an indication of an activity level achieved today 214, an activity level achieved upon completing route 216 (e.g., "20%"), and a daily goal 218. Goal indicator 212 can indicate these factors 214-218 in various ways, such as an arrow or other label, an actual number or percentage, and/or a proportionally shaded or colored portion of a bar or other two-dimensional shape.

The user can configure both the displayed activity value in snapshot route 210 (e.g., only calories or only steps or both), and also the activity value displayed on goal indicator 212.

In flow 206, the system can display multiple snapshot routes, which allows the user to select a route based on the user's dynamic constraints at the time of the request, such as additional or less time available to complete the route or a desire to consume more calories. Thus, in flow 206, the system can display both snapshot route 210 and a snapshot route 220, which can include a segment 221, via a motorized personal vehicle, with a distance of 1.0 miles, an estimated time duration of 4 minutes to complete segment 221, and an activity value for segment 221 (which includes 0 calories to be burned and 0 steps to be taken in completing segment 221). Snapshot route 220 can also include a segment 223, via walking, with a distance of 1.2 miles, an estimated time duration of 20.4 minutes to complete segment 223, and an activity value for segment 223 (which includes 144 calories to be burned and 2,400 steps to be taken in completing segment 223).

Snapshot route 220 can also include a "Total" 225 area, including: a total distance of 2.2 miles from the start location to the destination location; a total time of 25 minutes to complete snapshot route 220; and a total activity value for completing snapshot route 220 (which includes a total of 144 calories to be consumed and 2,400 steps to be taken in completing snapshot route 220).

Similar to snapshot route 210 including goal indicator 212, snapshot route 220 can include a goal indicator 222, which can include an indication of an activity level achieved today, an activity level achieved upon completing route (e.g., "24%"), and a daily goal.

In either of flows 204 and 206, the user can select a route, e.g., by clicking on the desired snapshot route, which can result in a flow 224 or a flow 226. Note that in some embodiments, when only one snapshot route is presented, the system can simultaneously display both the single snapshot route and the contents of display 230 as described below. Furthermore, when multiple snapshot routes are presented, the system can determine a default snapshot route for display, and can simultaneously display both the multiple snapshots and the corresponding display for the default snapshot route.

In either of flows 224 or 226, the system can display a map with the selected route, as in display 230. Display 230 can include a start 236 and a destination 238, as well as a segment 232 (corresponding to segment 211 of snapshot route 210) and a segment 234 (corresponding to segment 213 of snapshot route 210). Segment 232 can indicate the corresponding transportation type (e.g., a graphic of a car to represent a motorized personal vehicle), as well as an activity value and other information (as described above in relation to segment 211 of snapshot route 210). Similarly, segment 234 can indicate the corresponding transportation type (e.g., a graphic of a person walking "by foot"), as well as an activity value and other related information (as described above in relation to segment 213 of snapshot route 210).

Figure 2B:
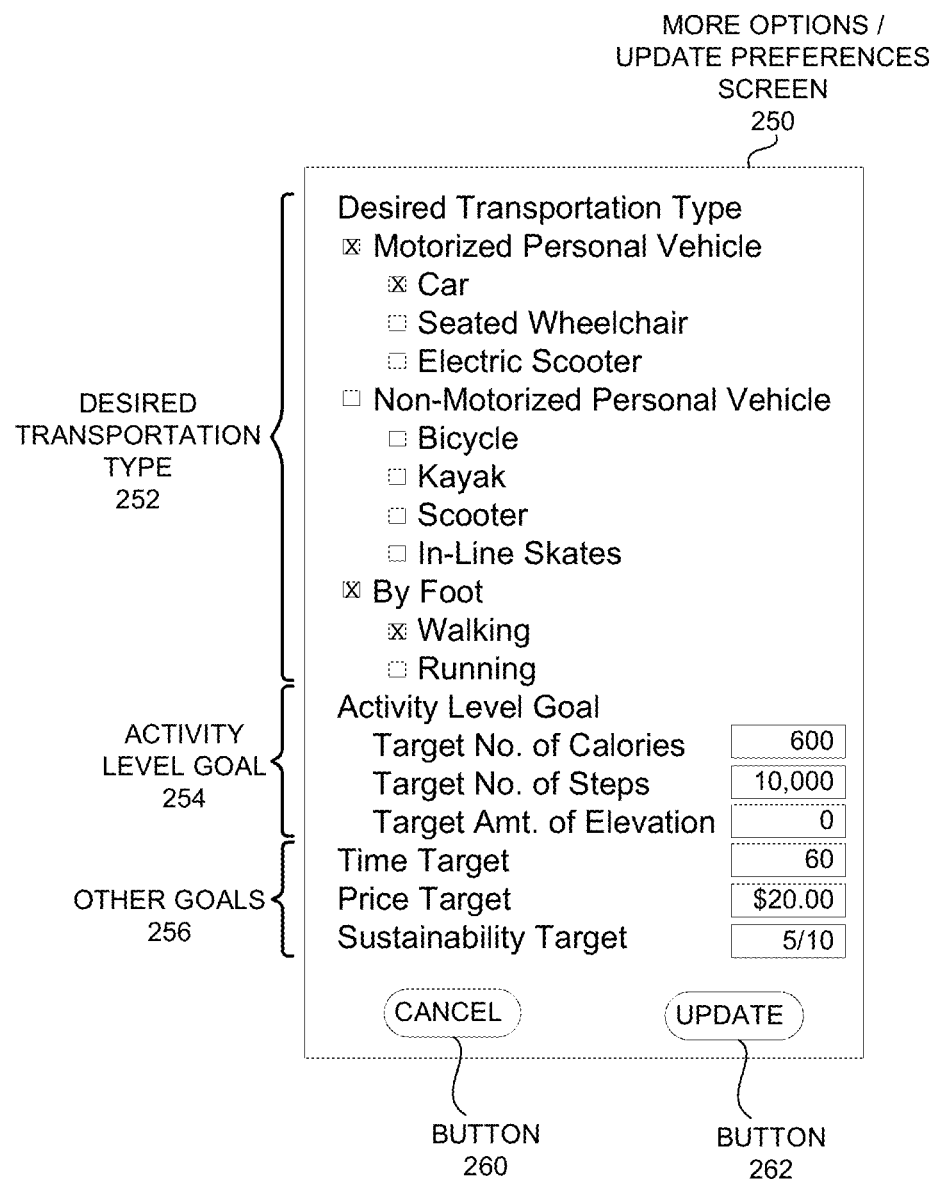
FIG. 2B presents an exemplary display for facilitating integration of recommended exercise with transportation directions, including an update preferences screen, in accordance with an embodiment of the present invention.

Returning to display 202, a user can also click on the "More Options . . . " link 172, which can result in a flow 208, which results in a display as described below in relation to FIG. 2B. FIG. 2B presents an exemplary display for facilitating integration of recommended exercise with transportation directions, including an update preferences screen 250, in accordance with an embodiment of the present invention. Update preferences (or "more options") screen 250 can include several categories, including a desired transportation type 252 with subcategories, an activity level goal 254 with sub-goals, and other goals 256 (including a time target, a price target, and a sustainability target). A category or subcategory can be selected (as in checkboxes for "Motorized Personal Vehicle" and "Car") or can include a discrete default or user-entered value (as in "600" for the target number of calories to be burned). Screen 250 can also include a specific time period (not shown) for activity level goal 254 or other goals 256. Screen 250 can also include any of the transportation-related preferences or other information described below in relation to FIGS. 3A and 3B. Screen 250 can also include a "Cancel" button 260 or other similar widget which does not save any changes and returns the user to display 202. Screen 250 can also include an "Update" button 262 or other widget which saves the changes and returns the user to display 202.

Exemplary User Profile and User Performance Table

Figures 3A, 3B:
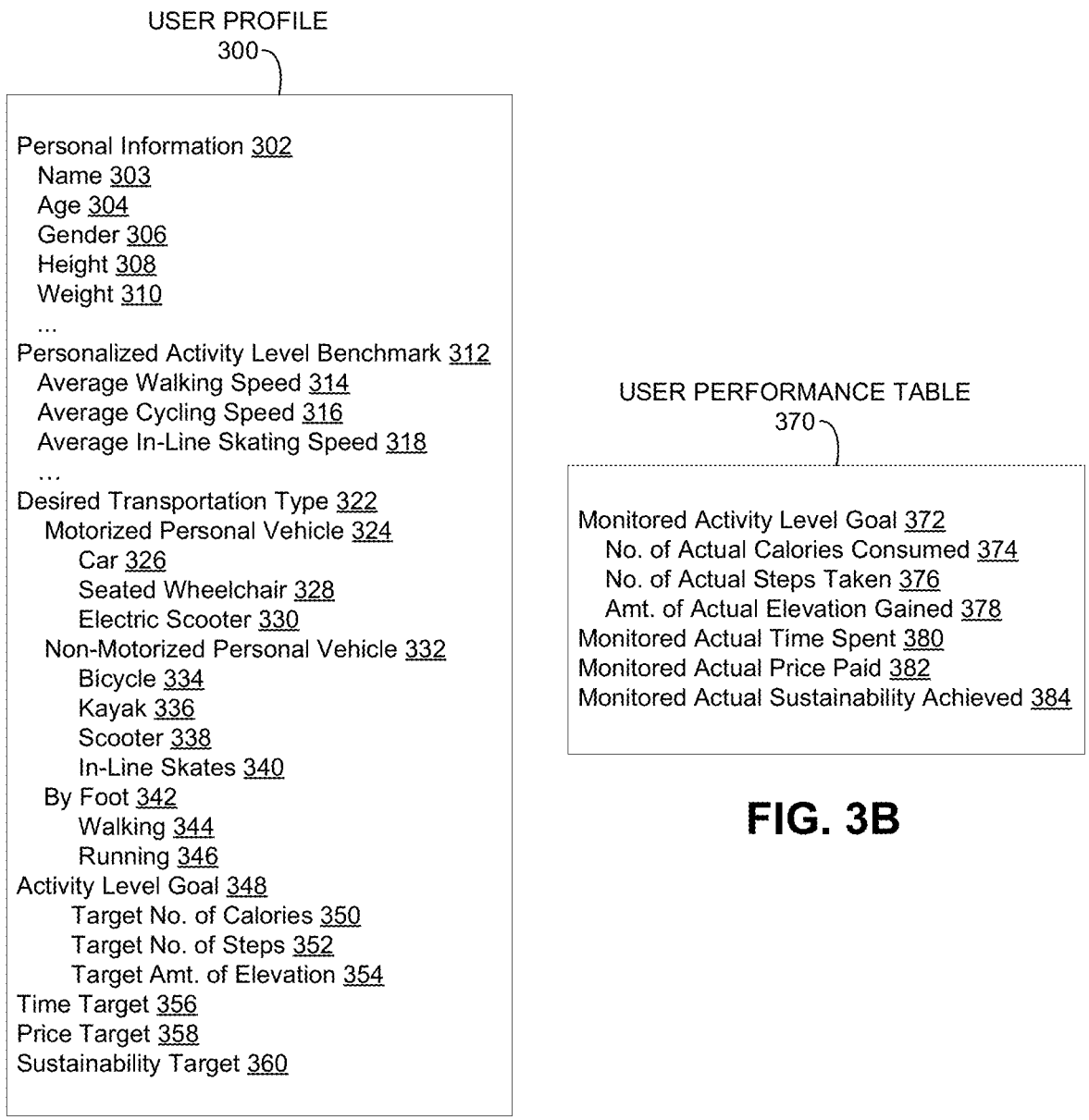
FIG. 3A presents an exemplary user profile for facilitating integration of recommended exercise with transportation directions, in accordance with an embodiment of the present invention.
FIG. 3B presents an exemplary user performance table for facilitating integration of recommended exercise with transportation directions, in accordance with an embodiment of the present invention.

FIG. 3A presents an exemplary user profile 300 for facilitating integration of recommended exercise with transportation directions, in accordance with an embodiment of the present invention. User profile 300 can include personal information 302, which can include, e.g., a name 303, an age 304, a gender 306, a height 308, and a weight 310. User profile 300 can also include a personalized activity level benchmark 312, which can include, e.g., an average walking speed 314, an average cycling speed 316, and an average in-line skating speed 318. The elements of benchmark 312 may be determined based on personal information 302 and a predetermined set of corresponding speeds, or on personal information 302 and a set of corresponding speeds obtained by measuring the user's performance in the corresponding areas (e.g., inferred from the user's performance on individual segments when following system recommendations, or requiring the user to walk at an "average" or "moderate" pace for 5 minutes or to cycle at a "vigorous" pace for 10 minutes).

User profile 300 can also include a desired transportation type 322, which can include a motorized personal vehicle 324, a non-motorized personal vehicle 332, and a "by foot" option 342. Each transportation type can have one or more subcategories. For example, motorized personal vehicle 324 can include the following subcategories: a car 326; a seated wheelchair 328; and an electric scooter 330. Non-motorized personal vehicle 332 can include the following subcategories: a bicycle 334; a kayak 336; a scooter 338; and in-line skates 340. By foot 342 can include the following subcategories: a walking option 344; and a running option 346. Note that the categories and subcategories depicted in user profile 300 are shown for exemplary purposes and are not an exhaustive list. Furthermore, while transportation-related preferences 124 is shown as a separate item within user profile 120 of FIG. 1, transportation-related preferences can include all of the items described above for user profile 300 of FIG. 3A.

FIG. 3B presents an exemplary user performance table 370 for facilitating integration of recommended exercise with transportation directions, in accordance with an embodiment of the present invention. Table 370 can include a monitored activity level goal 372, which can include, e.g.: a number of actual calories consumed 374; a number of actual steps taken 376; and an amount of actual elevation gained 378. Table 370 can also include a monitored actual time spent 380, a monitored actual price paid 382, and a monitored actual sustainability achieved 384. Table 370 can also include a specific time period (not shown) for monitored elements 372-384.

Table 370 may be stored as part of user profile 300 or as a separate table that can be linked to by, e.g., personal information 302. Profile 300 and table 370 may be stored on the same or separate devices.

Figure 4:
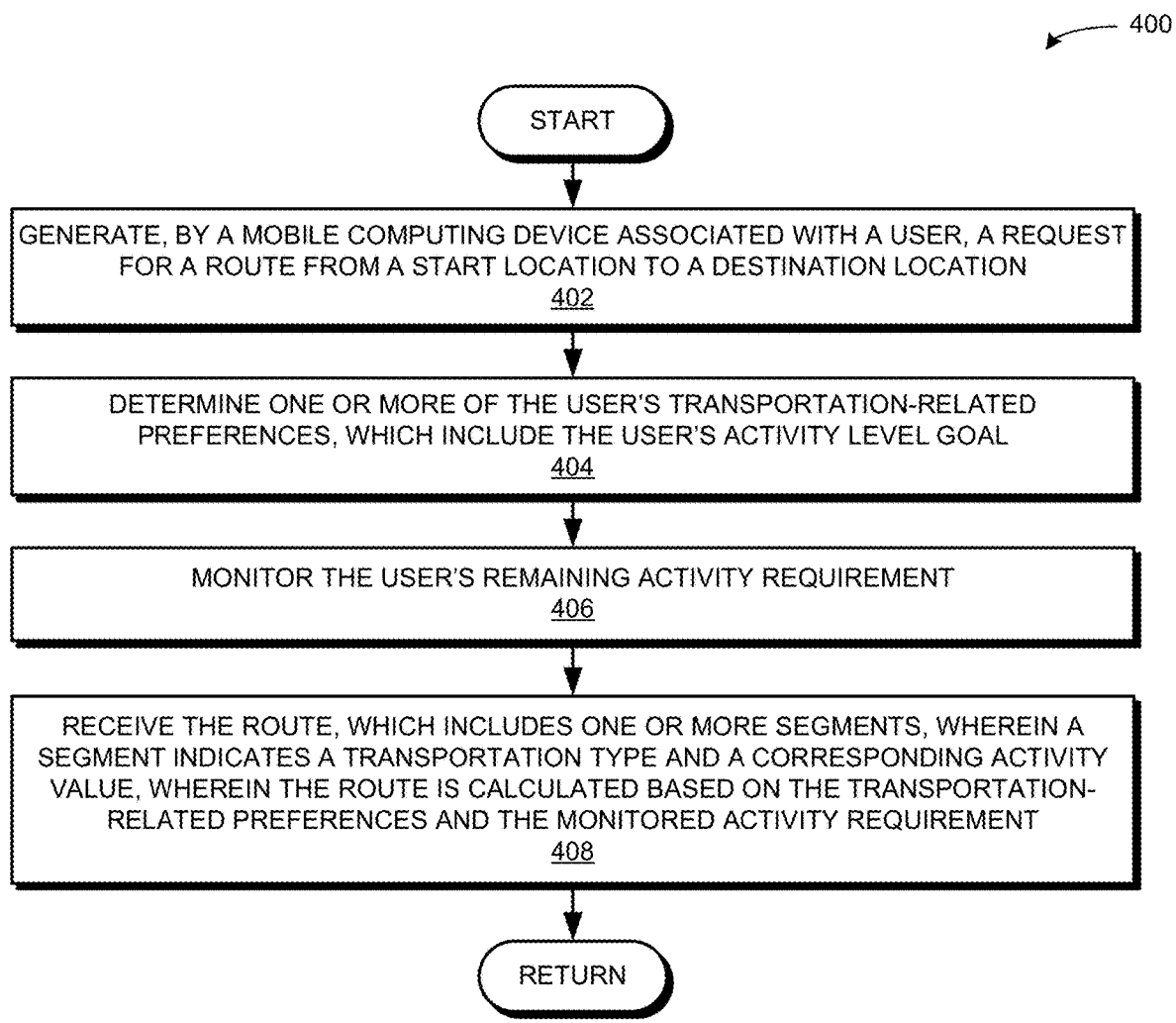
FIG. 4 presents a flow chart illustrating a method for facilitating integration of recommended exercise with transportation directions, in accordance with an embodiment of the present invention.

Method by User for Facilitating Integration of Recommended Exercise with Transportation Directions FIG. 4 presents a flow chart 400 illustrating a method for facilitating integration of recommended exercise with transportation directions, in accordance with an embodiment of the present invention. During operation, the system generates, by a mobile computing device associated with a user, a request for a route from a start location to a destination location (operation 402). The system determines one or more of the user's transportation-related preferences, which include the user's activity level goal (operation 404). The system monitors the user's activity requirement (operation 406) remaining for a target interval (e.g., the day). The system receives the route, which includes one or more segments, wherein a segment indicates a transportation type and a corresponding activity level value, wherein the route is calculated based on the transportation-related preferences and the monitored activity requirement (operation 408). For example, the route may be calculated based on the transportation-related preferences, the activity values of the segments, and the monitored activity requirement remaining for the target interval.

Figure 5A:
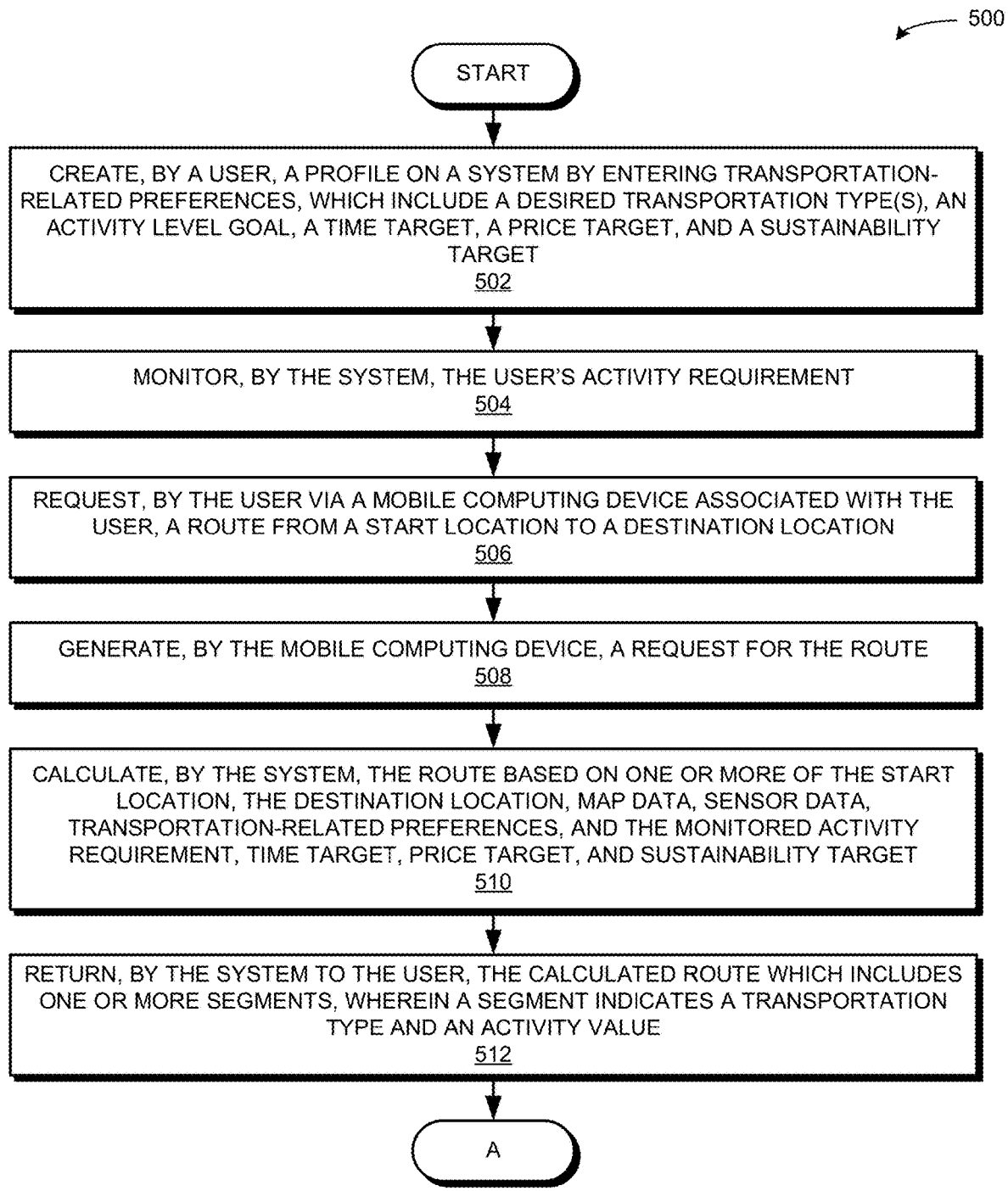
FIG. 5A presents a flow chart illustrating a method for facilitating integration of recommended exercise with transportation directions, including operations by both a user and a system, in accordance with an embodiment of the present invention.

Method by User and System for Facilitating Integration of Recommended Exercise with Transportation Directions FIG. 5A presents a flow chart 500 illustrating a method for facilitating integration of recommended exercise with transportation directions, including operations by both a user and a system, in accordance with an embodiment of the present invention. The system creates, by a user, a profile on a system by entering transportation-related preferences, which include a desired transportation type or types, an activity level goal, a time target, a price target, and a sustainability target (operation 502). The system monitors the user's activity requirement (operation 504). The system can monitor the user's activity requirement via, e.g., a health-related application on the user's mobile computing device, a smart watch, a sensor on a device, an accelerometer, a global-positioning system, or an attached external device such as a heart rate monitor or a blood pressure monitor. The system requests, by the user via a mobile computing device associated with the user, a route from a start location to a destination location (operation 506). The system generates, by the mobile computing device, a request for the route (operation 508). The system calculates the route based on one or more of the start location, the destination location, map data, sensor data, transportation-related preferences, and the monitored activity requirement, time target, price target, and sustainability target (operation 510). The transportation-related preferences can include the activity level goal, the time target, the price target, and the sustainability target, as described above in relation to FIG. 3A. The system returns to the user the calculated route which includes one or more segments, wherein a segment indicates a transportation type and an activity value (operation 512). The operation continues as described at Label A of FIG. 5B.

Figure 5B:
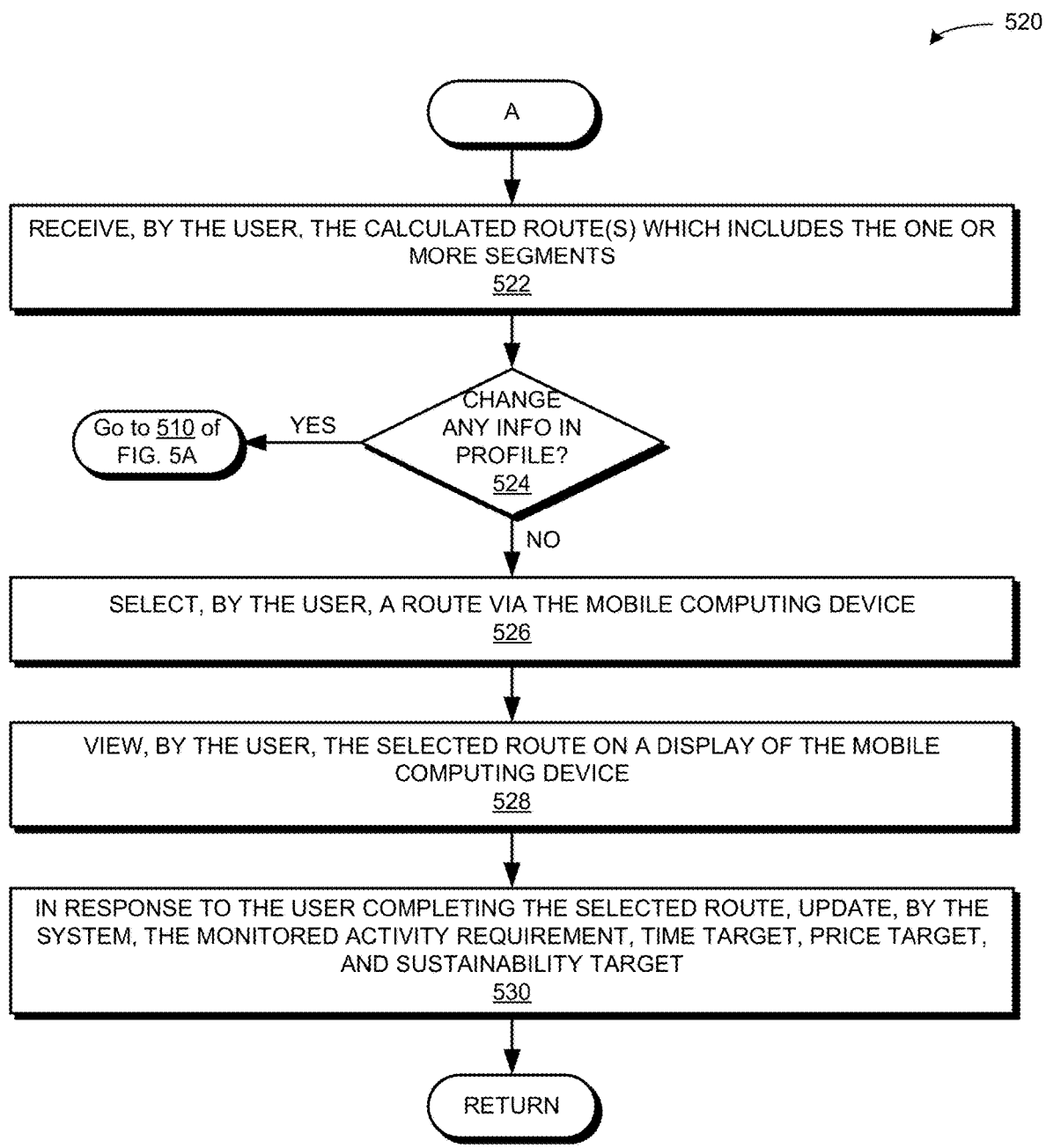
FIG. 5B presents a flow chart illustrating a method for facilitating integration of recommended exercise with transportation directions, including operations by both a user and a system, in accordance with an embodiment of the present invention.

FIG. 5B presents a flow chart 520 illustrating a method for facilitating integration of recommended exercise with transportation directions, including operations by both a user and a system, in accordance with an embodiment of the present invention. During operation, the system receives, by the user, the calculated route(s) which includes the one or more segments (operation 522). If the user changes any information in the user's profile (decision 524), the operation continues at operation 510 of FIG. 5A (i.e., calculating the route based on the transportation-related preferences, which include any changed information in the user's profile). The user can also change a transportation-related preference specifically for the requested route, e.g., by clicking a third transportation type on display 202, when the stored user profile may only include two transportations types as initially depicted on display 202.

If the user does not change any information in the user's profile (decision 524), the user selects a route via the mobile computing device (operation 526). The user can also perform other actions, such as ordering or sorting multiple routes based on a transportation-related preference (e.g., by most calories burned, least amount of time spent traveling, or lowest price to be paid). The user views the selected route on a display of the mobile computing device (operation 528). In response to the user completing the selected route, the system updates the monitored activity requirement, time target, price target, and sustainability target (operation 530).

Exemplary Device and Computer System

Figure 6:
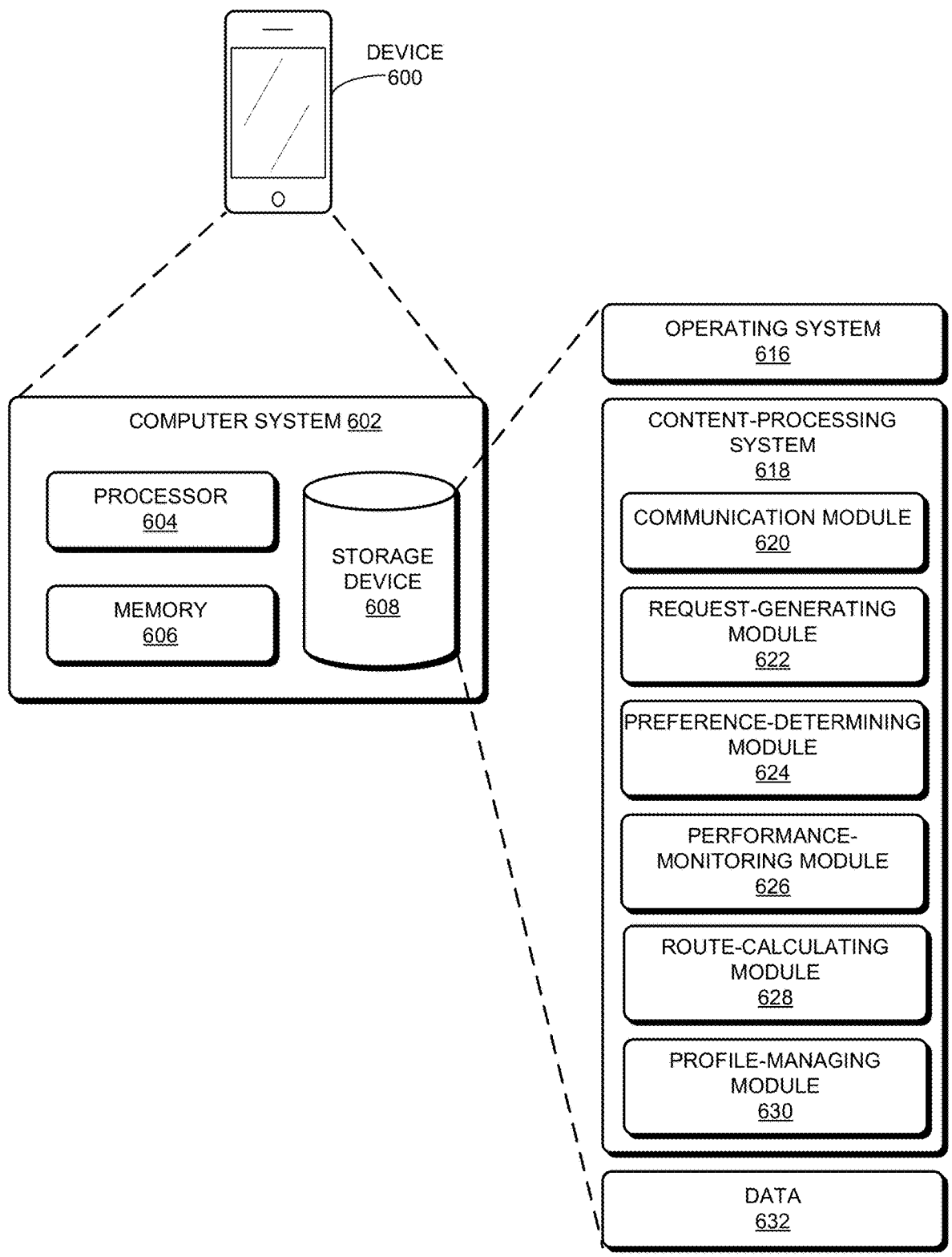
FIG. 6 illustrates an exemplary computer system for facilitating integration of recommended exercise with transportation directions, in accordance with an embodiment of the present invention.

FIG. 6 illustrates an exemplary computer system 602 for facilitating integration of recommended exercise with transportation directions, in accordance with an embodiment of the present invention. A device 600 can include computer system 602, which includes a processor 604, a memory 606, and a storage device 608. Memory 606 can include a volatile memory (e.g., RAM) that serves as a managed memory, and can be used to store one or more memory pools. Device 600 can be a personal smartphone, a mobile phone, a smart watch, a wireless-enabled wearable device, a tablet, a three-dimensional viewing glass, or any other mobile computing device. Storage device 608 can store an operating system 616, a content-processing system 618, and data 632.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network or within a network node itself (communication module 620). Content-processing system 618 can also include instructions for generating, by a mobile computing device associated with a user, a request for a route from a start location to a destination location (request-generating module 622). Content-processing system 618 can include instructions for determining one or more of the user's transportation-related preferences, which include the user's activity level goal (preference-determining module 624). Content-processing system 618 can additionally include instructions for monitoring the user's remaining activity requirement to achieve the activity level goal (performance-monitoring module 626). Content-processing system 618 can include instructions for receiving the route, which includes one or more segments, wherein a segment indicates a transportation type and a corresponding activity value (communication module 620).

Content-processing system 618 can further include instructions for calculating the route based on the transportation-related preferences and the monitored activity requirement (route-calculating module 628). Content-processing system 618 can include instructions for determining a profile for the user based on the user's transportation-related preferences (profile-managing module 630).

Data 632 can include any data that is required as input or that is generated as output by the methods and/or processes described in this disclosure. Specifically, data 632 can store at least: a request; a start location; a destination location; a request for a route from a start location to a destination location; transportation-related preferences; a user's activity level goal; monitored activity requirement to achieve the activity level goal; a route; a segment; a transportation type; an activity value; a route with one or more segments, wherein a segment indicates a transportation type and a corresponding activity value; a number of calories; a number of steps; an amount of elevation; a transportation type including a motorized vehicle associated with a user, a non-motorized vehicle associated with a user, non-motorized equipment that attaches to the user's body, a "by foot" indicator (e.g., walking, jogging, skipping, jumping, and running), and a public transit vehicle; a user profile; a user performance table; a desired transportation type; a user's sub-goals related to activity level and other areas, including a target number of calories to be consumed, a target number of steps to be taken, a target amount of elevation to be gained, a desired or monitored duration of time, a desired or monitored price to be paid, and a desired or monitored level of sustainability to be achieved; map data; and sensor data.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating integration of recommended exercise with transportation directions, the method comprising:
generating, by a mobile computing device associated with a user, a request for a first route from a start location to a destination location, wherein the first route includes transportation directions;
determining one or more of the user's transportation-related preferences, which include the user's activity level goal;
monitoring the user's remaining activity requirement to achieve the activity level goal to determine recommended exercise information;
receiving, based on the request for the first route from the start location to the destination location, one or more routes which are calculated based on the user's transportation-related preferences and the user's monitored remaining activity requirement,
wherein a respective route includes an indicator of an activity level to be achieved upon completing the respective route as a percentage of an activity goal over a predetermined period of time and further includes one or more segments, and
wherein a respective segment indicates a transportation type corresponding to the respective segment of the respective route and further indicates a corresponding activity value which comprises a number of calories predicted to be burned for completing the respective segment; and
integrating the user's monitored remaining activity requirement and the recommended exercise information with the transportation directions by displaying, on a display of the mobile computing device:
the one or more routes;
the indicator of the activity level to be achieved upon completing a respective route as a percentage of an activity goal over a predetermined period of time; and
the transportation type and the corresponding activity value predicted for completing a respective segment of the respective route.

2. The method of claim 1, wherein the corresponding activity value further comprises one or more of:
a number of steps predicted to be taken for completing the respective segment; and
an amount of elevation predicted to be gained for completing the respective segment.

3. The method of claim 1, wherein the transportation type includes one or more of:
a motorized vehicle associated with the user, including one or more of a car, a scooter, a wheelchair, and any motorized vehicle with one or more wheels;
a non-motorized vehicle associated with the user, including one or more of a bicycle, a wheelchair, a scooter, a vehicle which moves based on a motion with the user's feet or hands, a waterborne non-motorized personal vehicle, an airborne non-motorized personal vehicle, and any non-motorized vehicle with one or more wheels;
non-motorized equipment that attaches to the user's body, including one or more of in-line skates, roller skates, and any gear which allows the user to move based on a motion with the user's body;
walking, jogging, skipping, jumping, and running; and
a public transit vehicle, including one or more of a train, a bus, a boat, a ship, a ferry, a helicopter, an airplane, a waterborne public transit vehicle, an airborne public transit vehicle, and any public transit vehicle with one or more wheels.

4. The method of claim 1, further comprising determining a profile for the user based on the user's transportation-related preferences, which include:
a desired transportation type; and
the user's sub-goals related to activity level and other areas, including at least one of:
a target number of calories to be consumed for a predetermined time period;
a target number of steps to be taken for a predetermined time period;
a target amount of elevation to be gained for a predetermined time period;
a desired duration of time to complete the route;
a desired price to be paid to complete the route; and
a desired level of environmental sustainability to be achieved to complete the route.

5. The method of claim 1, wherein the route is calculated further based on one or more of:
the start location;
the destination location;
map data, including historical or real-time data associated with a geographical area which includes the start location and the destination location; and data obtained via a sensor of the mobile computing device.

6. The method of claim 1, wherein monitoring the user's remaining activity requirement to achieve the activity level goal is based on one or more of:
   a wireless-enabled wearable device that tracks the user's physical activity;
   a heart-rate monitoring device;
   a number of actual calories consumed in completing the segment;
   a number of actual steps taken in completing the segment;
   an amount of actual elevation gained in completing the segment;
   a measure of a price paid for completing the segment; and
   a measure of sustainability achieved in completing the segment.

7. The method of claim 1, wherein the transportation-related preferences further include:
   the user's desired time, which is a desired duration of time to be spent in a predetermined time period or to complete the route;
   the user's desired price, which is a desired price to be paid in a predetermined time period or to complete the route; and
   the user's desired sustainability, which is a desired level of sustainability to be achieved in a predetermined time period or to complete the route; and
   wherein the route further indicates one or more of:
      the user's activity level goal compared to the user's monitored activity requirement;
      the user's desired time compared to the user's monitored actual time spent;
      the user's desired price compared to the user's monitored actual price paid; and
      the user's desired sustainability compared to the user's monitored actual sustainability achieved.

8. A computer system for facilitating integration of recommended exercise with transportation directions, the computer system comprising:
   a processor; and
   a storage device storing instructions that when executed by the processor cause the processor to perform a method, the method comprising:
      generating, by a mobile computing device associated with a user, a request for a first route from a start location to a destination location,
      wherein the first route includes transportation directions;
      determining one or more of the user's transportation-related preferences, which include the user's activity level goal;
      monitoring the user's remaining activity requirement to achieve the activity level goal to determine recommended exercise information;
      receiving, based on the request for the first route from the start location to the destination location, one or more routes which are calculated based on the user's transportation-related preferences and the user's monitored remaining activity requirement,
      wherein a respective route includes an indicator of an activity level to be achieved upon completing the respective route as a percentage of an activity goal over a predetermined period of time and further includes one or more segments, and
      wherein a respective segment indicates a transportation type corresponding to the respective segment of the respective route and further indicates a corresponding activity value which comprises a number of calories predicted to be burned for completing the respective segment; and
      integrating the user's monitored remaining activity requirement and the recommended exercise information with the transportation directions by displaying, on a display of the mobile computing device:
         the one or more routes;
         the indicator of the activity level to be achieved upon completing a respective route as a percentage of an activity goal over a predetermined period of time; and
         the transportation type and the corresponding activity value predicted for completing a respective segment of the respective route.

9. The computer system of claim 8, wherein the corresponding activity value further comprises one or more of:
   a number of steps predicted to be taken for completing the respective segment; and
   an amount of elevation predicted to be gained for completing the respective segment.

10. The computer system of claim 8, wherein the transportation type includes one or more of:
    a motorized vehicle associated with the user, including one or more of a car, a scooter, a wheelchair, and any motorized vehicle with one or more wheels;
    a non-motorized vehicle associated with the user, including one or more of a bicycle, a wheelchair, a scooter, a vehicle which moves based on a motion with the user's feet or hands, a waterborne non-motorized personal vehicle, an airborne non-motorized personal vehicle, and any non-motorized vehicle with one or more wheels;
    non-motorized equipment that attaches to the user's body, including one or more of in-line skates, roller skates, and any gear which allows the user to move based on a motion with the user's body;
    walking, jogging, skipping, jumping, and running; and
    a public transit vehicle, including one or more of a train, a bus, a boat, a ship, a ferry, a helicopter, an airplane, a waterborne public transit vehicle, an airborne public transit vehicle, and any public transit vehicle with one or more wheels.

11. The computer system of claim 8, wherein the method further comprises:
    determining a profile for the user based on the user's transportation-related preferences, which include:
    a desired transportation type; and
    the user's sub-goals related to activity level and other areas, including at least one of:
       a target number of calories to be consumed for a predetermined time period;
       a target number of steps to be taken for a predetermined time period;
       a target amount of elevation to be gained for a predetermined time period;
       a desired duration of time to complete the route;
       a desired price to be paid to complete the route; and
       a desired level of environmental sustainability to be achieved to complete the route.

12. The computer system of claim 8, wherein the route is calculated further based on one or more of:
    the start location;
    the destination location;
    map data, including historical or real-time data associated with a geographical area which includes the start location and the destination location; and data obtained via a sensor of the mobile computing device.

13. The computer system of claim 8, wherein monitoring the user's remaining activity requirement to achieve the activity level goal is based on one or more of:
a wireless-enabled wearable device that tracks the user's physical activity;
a heart-rate monitoring device;
a number of actual calories consumed in completing the segment;
a number of actual steps taken in completing the segment;
an amount of actual elevation gained in completing the segment;
a measure of a price paid for completing the segment; and
a measure of sustainability achieved in completing the segment.

14. The computer system of claim 8, wherein the transportation-related preferences further include:
the user's desired time, which is a desired duration of time to be spent in a predetermined time period or to complete the route;
the user's desired price, which is a desired price to be paid in a predetermined time period or to complete the route; and
the user's desired sustainability, which is a desired level of sustainability to be achieved in a predetermined time period or to complete the route; and
wherein the route further indicates one or more of:
the user's activity level goal compared to the user's monitored activity requirement;
the user's desired time compared to the user's monitored actual time spent;
the user's desired price compared to the user's monitored actual price paid; and
the user's desired sustainability compared to the user's monitored actual sustainability achieved.

15. A non-transitory computer-readable storage medium storing instructions that when executed by a computer cause the computer to perform a method, the method comprising:
generating, by a mobile computing device associated with a user, a request for a first route from a start location to a destination location, wherein the first route includes transportation directions;
determining one or more of the user's transportation-related preferences, which include the user's activity level goal;
monitoring the user's remaining activity requirement to achieve the activity level goal to determine recommended exercise information;
receiving, based on the request for the first route from the start location to the destination location, one or more routes which are calculated based on the user's transportation-related preferences and the user's monitored remaining activity requirement,
wherein a respective route includes an indicator of an activity level to be achieved upon completing the respective route as a percentage of an activity goal over a predetermined period of time and further includes one or more segments, and
wherein a respective segment indicates a transportation type corresponding to the respective segment of the respective route and further indicates a corresponding activity value which comprises a number of calories predicted to be burned for completing the respective segment; and
integrating the user's monitored remaining activity requirement and the recommended exercise information with the transportation directions by displaying, on a display of the mobile computing device:
the one or more routes;
the indicator of the activity level to be achieved upon completing a respective route as a percentage of an activity goal over a predetermined period of time; and
the transportation type and the corresponding activity value predicted for completing a respective segment of the respective route.

16. The storage medium of claim 15, wherein the corresponding activity value further comprises one or more of:
a number of steps predicted to be taken for completing the respective segment; and
an amount of elevation predicted to be gained for completing the respective segment.

17. The storage medium of claim 15, wherein the transportation type includes one or more of:
a motorized vehicle associated with the user, including one or more of a car, a scooter, a wheelchair, and any motorized vehicle with one or more wheels;
a non-motorized vehicle associated with the user, including one or more of a bicycle, a wheelchair, a scooter, a vehicle which moves based on a motion with the user's feet or hands, a waterborne non-motorized personal vehicle, an airborne non-motorized personal vehicle, and any non-motorized vehicle with one or more wheels;
non-motorized equipment that attaches to the user's body, including one or more of in-line skates, roller skates, and any gear which allows the user to move based on a motion with the user's body;
walking, jogging, skipping, jumping, and running; and
a public transit vehicle, including one or more of a train, a bus, a boat, a ship, a ferry, a helicopter, an airplane, a waterborne public transit vehicle, an airborne public transit vehicle, and any public transit vehicle with one or more wheels.

18. The storage medium of claim 15, wherein the method further comprises:
determining a profile for the user based on the user's transportation-related preferences, which include:
a desired transportation type; and
the user's sub-goals related to activity level and other areas, including at least one of:
a target number of calories to be consumed for a predetermined time period;
a target number of steps to be taken for a predetermined time period;
a target amount of elevation to be gained for a predetermined time period;
a desired duration of time to complete the route;
a desired price to be paid to complete the route; and
a desired level of environmental sustainability to be achieved to complete the route.

19. The storage medium of claim 15, wherein the route is calculated further based on one or more of:
the start location;
the destination location;
map data, including historical or real-time data associated with a geographical area which includes the start location and the destination location; and
data obtained via a sensor of the mobile computing device.

20. The storage medium of claim 15, wherein monitoring the user's activity requirement to achieve the activity level goal is based on one or more of:

a wireless-enabled wearable device that tracks the user's physical activity;
a heart-rate monitoring device;
a number of actual calories consumed in completing the segment;
a number of actual steps taken in completing the segment;
an amount of actual elevation gained in completing the segment;
a measure of a price paid for completing the segment; and
a measure of sustainability achieved in completing the segment.

\* \* \* \* \*